United States Patent
Giraldo

(10) Patent No.: US 9,874,758 B2
(45) Date of Patent: Jan. 23, 2018

(54) COMPUTING DEVICE DISPLAY HOUSING WITH MODIFIED DISPLAY CHARACTERISTICS

(71) Applicant: Orangeberry Corporation, Dallas, TX (US)

(72) Inventor: Hernan Giraldo, Dallas, TX (US)

(73) Assignee: Orangeberry Corporation, Dallas, TX (US)

( * ) Notice: Subject to any disclaimer, the term of this patent is extended or adjusted under 35 U.S.C. 154(b) by 238 days.

(21) Appl. No.: 14/193,095

(22) Filed: Feb. 28, 2014

(65) Prior Publication Data

US 2014/0247497 A1  Sep. 4, 2014

Related U.S. Application Data

(60) Provisional application No. 61/771,494, filed on Mar. 1, 2013.

(51) Int. Cl.
*G02B 27/02* (2006.01)

(52) U.S. Cl.
CPC .................................. *G02B 27/022* (2013.01)

(58) Field of Classification Search
CPC .. G02B 27/022; G02B 27/0172; G02B 27/02; G02B 27/144; G02B 27/017; G02B 27/0101; G02B 5/0278; G03B 21/625; G03B 21/62; G03B 21/00; G03B 21/28; H04N 7/147; H04N 7/15; H04N 7/152; H04N 7/144; G09F 19/18; G09F 3/003

USPC .............. 359/601, 629, 630, 633, 454, 460; 348/14.08, 14.01, 14.09, 14.16; 353/28, 353/98, 99; 345/7, 8, 9

See application file for complete search history.

(56) References Cited

U.S. PATENT DOCUMENTS

| | | | |
|---|---|---|---|
| 7,481,539 B2 * | 1/2009 | Giraldo .................. | G06Q 10/00 353/28 |
| 2006/0181607 A1 * | 8/2006 | McNelley .......... | G02B 27/2292 348/14.08 |
| 2010/0182513 A1 * | 7/2010 | DeOtte ................ | H04N 5/2222 348/722 |
| 2011/0315733 A1 * | 12/2011 | White ....................... | A45F 5/00 224/600 |
| 2014/0218615 A1 * | 8/2014 | Williams, IV ........... | H04N 5/28 348/722 |

* cited by examiner

*Primary Examiner* — Jie Lei

(57) ABSTRACT

A display device may be inserted into a video conferencing device to provide a more tailored approach to talking and viewing other conversation participants in real time. In one example, a base supports a bottom portion of a computing device at an angled position. A frame supports side portions of the computing device at the angled position so a first optical element with a reflective surface can reflect content of the computing device. Also, a second optical element that is at a higher position than the first optical element includes a beamsplitting surface to receive a reflection from the first optical element as part of a head-up display setup. A hood may be used to cover a portion of the area of all the other components to prevent a portion of ambient light from reaching the first optical element and the second optical element.

9 Claims, 4 Drawing Sheets

200

COMPUTING DEVICE DISPLAY HOUSING WITH MODIFIED DISPLAY CHARACTERISTICS

CROSS-REFERENCE TO RELATED APPLICATIONS

This application claims priority to earlier filed provisional patent application No. 61/771,494, entitled "DEVICE" and filed on Mar. 1, 2013, and is related to U.S. application Ser. No. 11/145,082, filed on Jun. 3, 2005, now issued U.S. Pat. No. 7,481,539, issued on Jan. 27, 2009 entitled APPARATUS, SYSTEM, AND METHOD FOR THE WEB-BASED CREATION, MANAGEMENT, AND PUBLICATION OF ENHANCED AUDIOVISUAL PRESENTATIONS FROM A USER'S DESKTOP, and U.S. application Ser. No. 12/343,840, filed on Dec. 24, 2008, now issued U.S. Pat. No. 7,972,006, issued on Jul. 5, 2011 entitled APPARATUS, SYSTEM, AND METHOD FOR THE DESKTOP-BASED CREATION, MANAGEMENT, AND PUBLICATION OF ENHANCED AUDIOVISUAL PRESENTATIONS, each of which is incorporated herein by reference.

TECHNICAL FIELD OF THE APPLICATION

This application relates to an apparatus that provides a compact, portable, foldable housing, and in particular, a housing that fits over a computing device to provide a script prompting and/or videoconferencing function for the computing device, such as computing tablets, laptop PCs, notebooks, smartphones, cellular phones, and the like.

BACKGROUND OF THE APPLICATION

Conventionally, the design of a computing device housing provides no modifications to the viewing area of the computing device display. Most housings for computing devices are merely shock absorbers which aid to reduce breakage if the computing device were to fall onto the floor.

Computing devices are rapidly growing in popularity as portals for audio and visual communication, which requires a software application, a real-time communication connection and a device which can receive and transmit audio and video data in a relatively clear and coherent manner. The lack of design considerations and failure to properly channel the audio and visual sources (e.g., microphones, cameras, etc.) has left the communication applications and interfaces with limited functionality.

SUMMARY OF THE APPLICATION

An example embodiment may include an apparatus with a first optical element with at least one reflective surface configured to reflect content displayed by a computing device, the first optical element is affixed to a pair of registration arms which extend along a portion of the computing device's outer surface. The apparatus includes a second optical element with a beamsplitting filtered surface configured to receive content reflected from the first optical element and a hood configured to rest along a top portion of the computing device which extends outward to block a portion of ambient light, the hood is affixed to the second optical element via at least one hinge point.

Another example embodiment may include an apparatus including a base configured to support a bottom portion of a computing device at an angled position, and a frame configured to support side portions of the computing device at the angled position. The apparatus also includes a first optical element which is affixed to the frame with at least one reflective surface and a second optical element affixed to the frame at a higher position than the first optical element, the second optical element includes a beamsplitting surface configured to receive a reflection from the first optical element, and a housing configured to cover a portion of an area of the base, the frame, the first optical element and the second optical element and configured to block a portion of ambient light from reaching the first optical element and the second optical element.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of an apparatus, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

Figure 1:
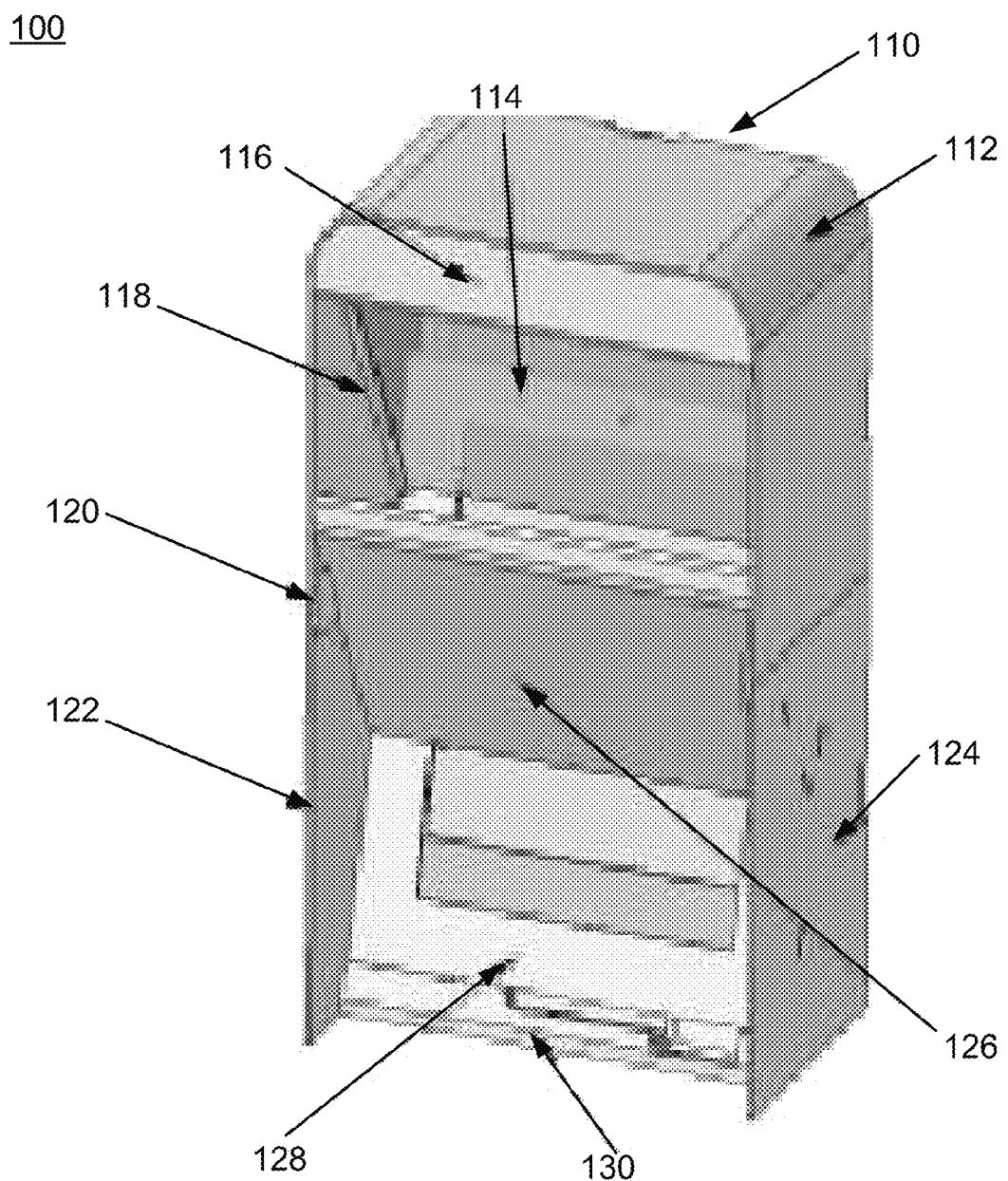
FIG. 1 is a front view of the computing device housing and corresponding optical element configuration according to example embodiments.

FIG. 1 is a computing device housing or display device housing according to example embodiments. Referring to FIG. 1, the display device housing 100 includes multiple different optical elements, facets and covers which provide a variety of functions in conjunction with the computing device, which may be placed inside the collapsible housing configuration. The top cover hood 112 may extend around one of the four sides of a computing device or display device to provide a light reducing shade or cover to optimize the user's viewing experience. The hood 112 may be contiguous with the top front baffle optical element which extends down from the hood at approximately 90 degrees (+/−10 degrees)

to provide additional shading and light reduction to the viewable display surface and/or the heads-up display clear glass 114.

An angled lip or protrusion may hold the clear glass optical element 114 in place at the specified angle 116. Also, the optical elements 114 and 126 may be kept in place by the pivot points or hinges described in detail in FIG. 3. The box joint flange strip 120 may hold the front mirror optical element 126 with the mirror side facing the display device to reflect the images or other content onto the heads-up display glass where a user may look into the housing to observe another user's image speaking during a live teleconference session. The mirror optical element also serves to reduce the display content size via a transposed and reflected version of the display content that is observable from the heads-up display glass lens optical element 114.

On the exterior portion of the housing, the cover side right optical element 124 may be 2-8 inches across to provide a sizable housing depth beyond the depth of the computer display device resting at an angled position (e.g., angled backward at 10-45 degrees from a vertical position). Similarly, the cover side left optical element 122 may be a similar housing structure as the right side optical element 124. The base block 130 may provide a snap-in locking mechanism, a resting lip or other securing mechanism that provides a gravity stopping surface for the computer display device to be held at an angled position. The screen frame optical element 128 provides a view of the display device set inside the housing.

Figure 2:
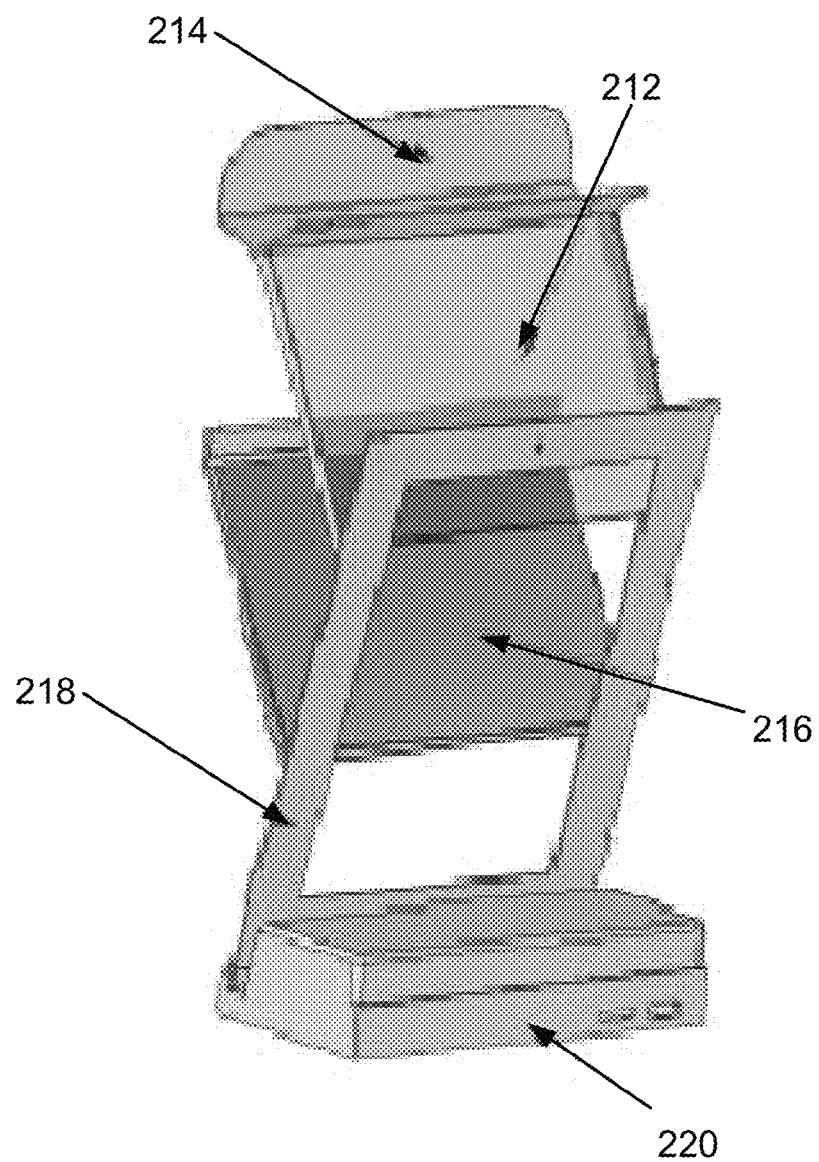
FIG. 2 is an interval view of the optical element configuration inside the computing device housing according to example embodiments.
Figure 3:
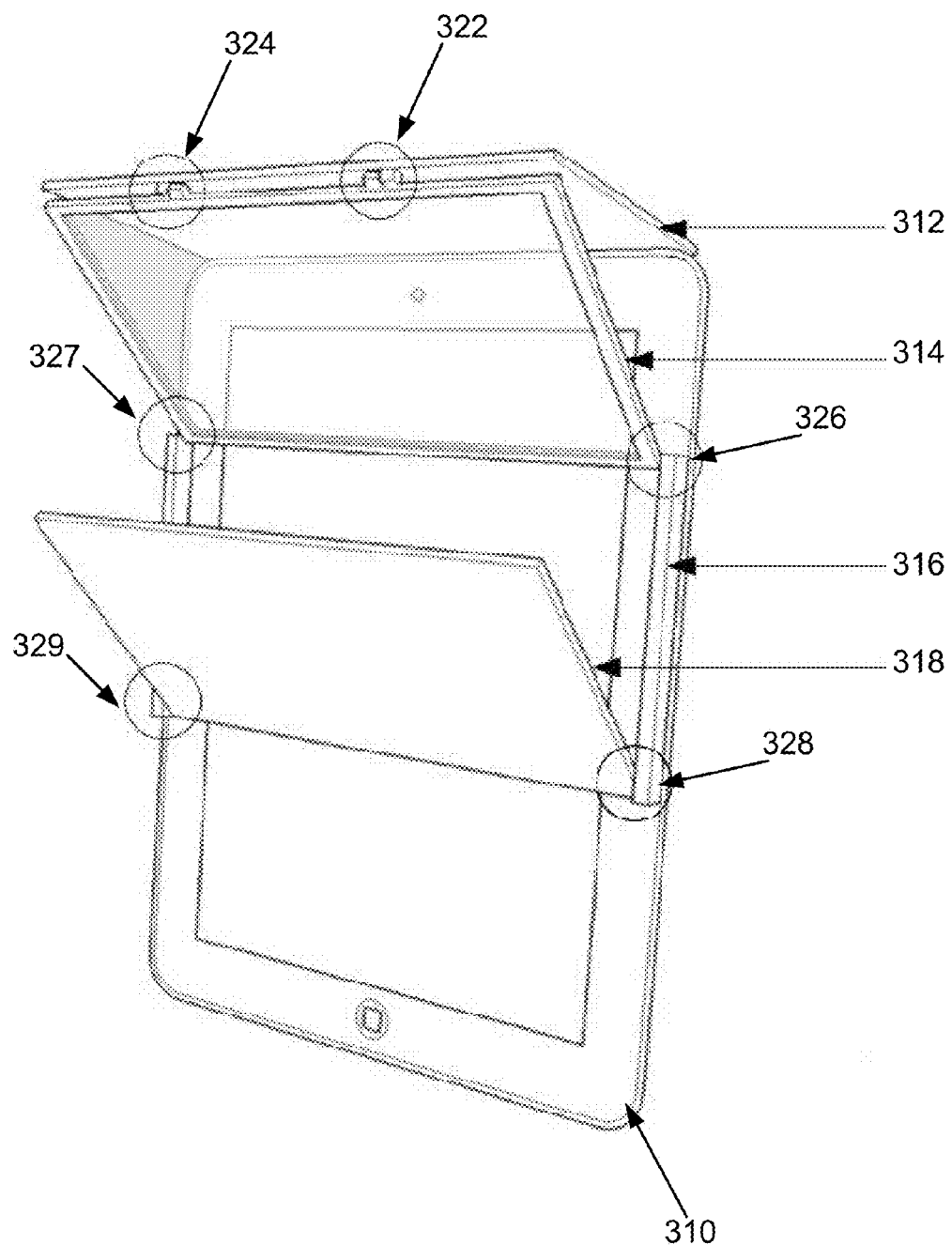
FIG. 3 is a detailed front view of the optical element configuration inside the computing device housing according to example embodiments.

In operation, a computing display device may attach to the housing configuration by any of a clamping mechanism(s), sliding railings, imbedded magnets, resting surfaces, hinged securing mechanism, etc. In the examples of FIGS. 1-3, the computing device is a tablet computing device, such as an IPAD or other well-known computer tablet device, however, other computer and related display devices may also be used with the configurations of the example embodiments.

In FIG. 2, the rear view perspective 200 includes the housing device with two main portions including a base 220 that holds the computer display device in a standing position and a hood (refer to FIG. 1) that slides on top of the mobile device once the base and optical elements are setup. The base block 220 can be lengthened and widened in one example embodiment via pull-out arms or supporting wings which slide in and out of the base block (not shown). The block 220 will support the display device in a hands-free standing position to permit the user to interact with the device without having to hold it at the same time. Additionally, the base 220 has a carved-out sound chamber designed to bounce the audio produced by the speaker of the device to the user display area at the top portion of the housing. This provides an effective audio channel or voice tunnel for devices with the speaker on the backside, such as the APPLE IPAD device.

Referring again to FIG. 2, the screen frame optical element 218 may provide a resting surface for the tablet computing device to rest at an angle. The reflector mirror 216 may reflect the visual content of the table device and cause the image to be transposed to the heads-up display clear glass or beamsplitter surface 212 which provides a reflective surface that produces the content of the display at a resized and viewable angle for a user looking into the top section of the housing. The clear glass heads-up optical element 212 is attached to a top front baffle optical element 214 which rests inside the hood cover to reduce light and support the glass surface 212 in an upright and angled position. The hood or capsule cover outer portion can be lengthened or widened in one example embodiment to accommodate a longer or wider tablet computing device or smartphone, and will slide down the mobile device to the base.

The hood houses several components including the lower mirror optical element 216, and the upper clear glass beamsplitting optical element 212 which may include a filter that performs a beam splitting function. The sliding railing or the screen frame 218 is also surrounded by the upper hood and cover side optical elements of FIG. 1. The hood portion 110 of FIG. 1 provides several functions including holding the optical portions in place, holding the sound chamber that funnels the voice sound waves of the user into the device's microphone which are normally in the back of the mobile device, and providing coverage from ambient or room light to the mirror and other optical element components as well as the mobile device screen inside the hood.

In one example embodiment, the housing and optical elements are all one single connecting set of pieces. For example, when the device components are all attached as a single unit, the device may include the base, the hood or capsule, and the optical elements, however, each of the components may be manufactured and packaged as one device. In other words, in the example embodiment it will not be possible for the components to be taken apart from the self-contained unit. In this example, the display device will be attached to the base and the hood.

In an alternative example embodiment, when the device includes two pieces and the hood is collapsible, a base will hold the mobile computer in a standing position as illustrated in FIG. 2, and the hood will slide on top of the mobile device as it attaches to the base separately. The two pieces with the collapsible hood will permit for the hood to be collapsed into a smaller and more portable unit, and thus provide more portability to the device and for the user to move the device from one location to another. The hood 110 will have the same components as the non-collapsible hood, but will be designed in such a way that it is foldable and collapsible into a volume that occupies less space for stowing, storing and/or transporting.

In another example embodiment of FIG. 3, the housing device 300 may include a hood and top grip platform 312 which is configured to rest above the computing device at a substantially perpendicular angle to the standing surface of the computing device 310. The hood 312 serves the function of shading the beamsplitter lens or surface 314 from ambient light to optimize reflectivity and the corresponding observability of the surface via a user. The hood 312 may stay affixed to the edge of the computing device 310 to aid the registration arms 316 on both sides of the device, which may be magnetic or secured to the mobile computer device in any other manner (e.g., friction fitted, clamped, etc.), with bearing a portion of the weight and vertical load.

The beamsplitter mirror/film optical element 314 provides the function of receiving and reflecting a copy of the content received from the bottom mirror optical element 318, which reflects the image of the device screen onto the upper mirror or beamsplitter surface 314, which may have a particular filter or beam splitting coefficient. The beam splitter's front face portion then reflects the image coming from the lower mirror onto the user's eyes, while allowing the onboard camera to record a clear image of the user as the back side of the upper mirror is coated with a filter that does not reflect any light and which acts as a relatively transparent glass instead of a mirror. The beamsplitter is coated specifically to permit light on one side to be totally reflected (front side) and light on the other side to not be reflected at all (back side) of the glass.

Registration arms 316 serve the function of locating the device by the way the magnets are polarized and aligned with the magnets on the device. The arms also serve the function of providing hinge points 326-329 for the deployment of the beamsplitter/hood assembly and bottom mirror 318 from a folded position to an operational position. The optical elements 314 and 318 may rotate around an axis provided by the hinge points 326-329. In one embodiment, the arms have magnets imbedded inside so as to create the magnetic pull necessary to attach to the magnets imbedded on the device. The magnets may be imbedded within the arms of the device facing the computing device, the magnets that are set to be within the computing device 310 will be imbedded around the outer rim/edges of the computing device. The bottom mirror/reflecting film of optical element 318 serves the function of reflecting an onscreen copy to the beamsplitter optical element 314. The upper hinges 322 and 324 may stay attached to the beamsplitter optical element 314 while the device is being rotated into position.

In one example, a user may obtain the projection device in its contracted/undeployed state as a slim rectangle object and place it in front of the computer device. Due to the polarity configuration of the magnets in both the display device and the projection device, the magnets should attach exactly in the same way every time and will be aligned with the edges of the computer device. Once the computer device and the projection device are attached and aligned, the user will deploy the device by unfolding the bottom mirror 318 first and then raising the top optical element/beamsplitter 314 and the upper hood 312 to conform the object to a deployed state as depicted in FIG. 3. At this point, the image on the screen of the device 310 will be aligned with the lower mirror's position. The image on the screen could be the headshot of another person or scrolling text to be read by the user or a combination of both. That image will be reflected via a mirror effect by the lower mirror optical element 318 onto the upper beam splitter front face optical element 314, which will then reflect that image via a mirror effect onto the user's eyes. At this point, the user is looking directly at the projected image on the upper beamsplitter surface optical element 314 and at the embedded webcam of the computing device 310. This configuration is useful for human communications since it generates eye contact on a videoconference session, which is an integral part of human communication.

Figure 4:
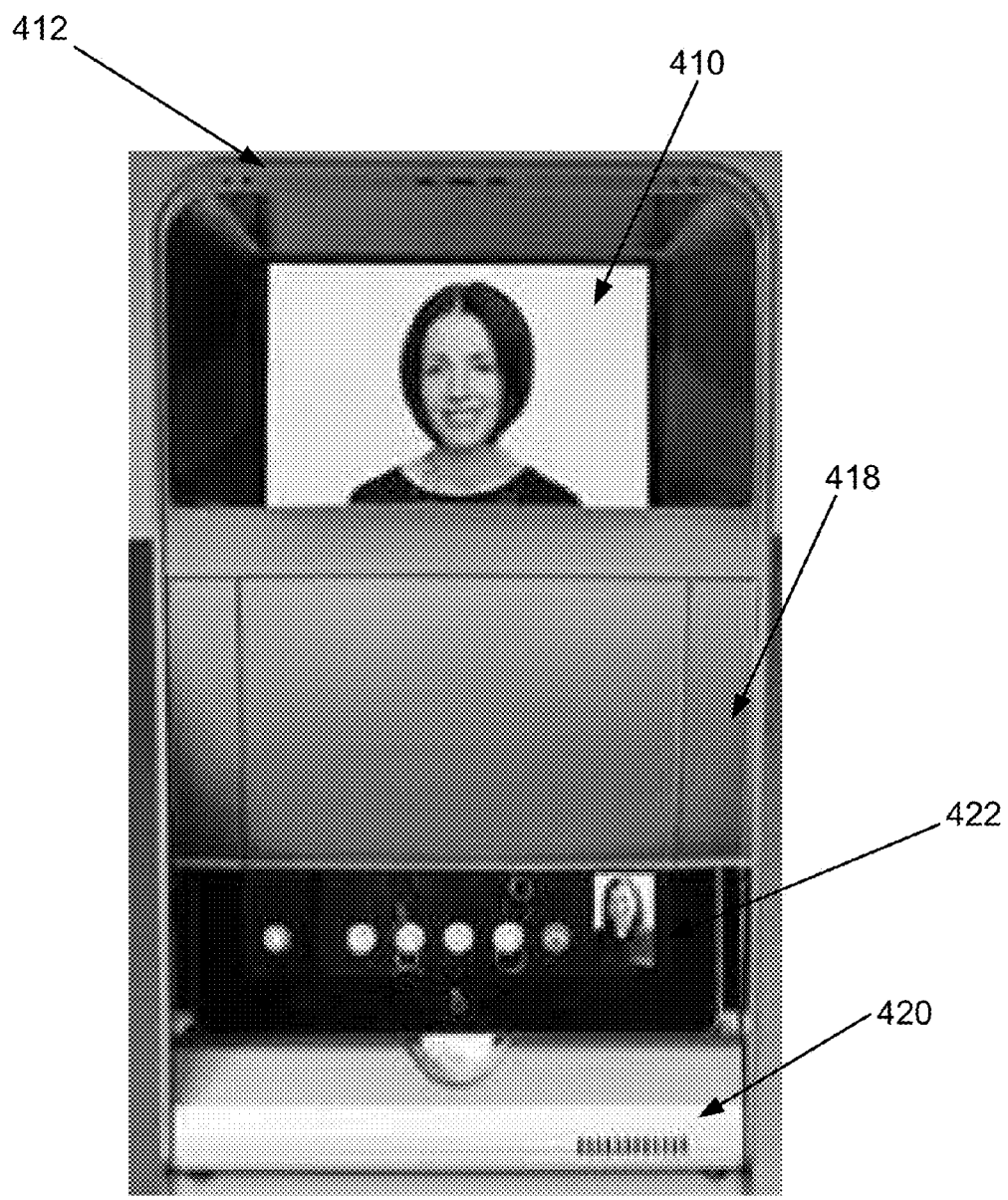
FIG. 4 is another front view of the housing configuration and corresponding computing device performing a teleconferencing session according to example embodiments.

FIG. 4 is another front view of the housing configuration and corresponding computing device performing a teleconferencing session according to example embodiments. Referring to FIG. 4, the computing device housing configuration 400 includes the housing hood and corresponding cover 412 surrounding the computing device display 422. The base 420 provides a resting surface and angled configuration to lean the computing device at a predefined angle (i.e., 10-45 degrees) so the optical element mirror 418 may reflect the image data onto the beamsplitting optical element which provides the image data 410 to the viewer The above example embodiments provide a teleprompter device for teleprompting applications and a portable script prompters/eye contact assisting tool designed for use with mobile computer devices that have an imbedded front facing camera/web-camera during a videoconference session and/or a recording of an audiovisual presentation and the like.

One of the functions of this device is creating direct eye contact between the subject recording the presentation and the webcam while a script is being prompted to the subject. Additionally, another function is to produce the same eye contact effect between two people conducting a videoconference, since with the help of this device, both parties will be able to look at the other's person face and stare at the webcam at the same time if both parties are using such a display configuration device.

The example embodiments can be used with mobile computer devices. The example embodiments have arms with imbedded magnets to help the unit attach to the various different mobile computer devices that may also have imbedded magnets installed as well to help align with the position within the screen in which the software window will be projected. Another embodiment of this device could utilize clasping mechanisms within the arms that will permit the prompting device to attach to other mobile computing devices that do not have embedded magnets. The device embodiments are foldable into a small rectangular shape when the device is not deployed and which makes it portable and light to carry around with a mobile computing device.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the invention.

One having ordinary skill in the art will readily understand that the application as discussed above may include hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What is claimed is:

1. An apparatus comprising:
   a base comprising an elongated slot configured to surround and hold a bottom edge of a tabular computing device at a backward angled position with respect to the base;
   a frame extending upward from the elongated slot of the base, and configured to slidably receive the bottom edge of the tabular computing device at the backward angled position and guide the bottom edge into the elongated slot;
   a first optical element affixed to the frame comprising at least one reflective surface;
   a second optical element affixed to the frame at a higher position than the first optical element is affixed to the frame, the second optical element comprising a beamsplitting surface configured to receive a reflection from the first optical element; and
   wherein, while the bottom edge of the tabular computing device is held by the elongated slot of the base, the second optical element affixed to the frame extending upward from the elongated slot of the base is positioned directly in front of and aligned in both height and lateral position with an embedded web camera of the tabular computing device such that light from a screen disposed between the embedded web camera and the bottom edge of the tabular computing device is reflected by the first and second optical elements affixed to the frame extending upward from the elongated slot holding the tabular computing device, and is directed from the second optical element on an optical path that is two-dimensionally aligned with an imaging path of the embedded web camera of the tabular computing device positioned directly behind the second optical element.

2. The apparatus of claim 1, wherein the first optical element is affixed to the frame via a first pair of corresponding hinge points which permit the first optical element to rotate around an axis of the first pair of hinge points.

3. The apparatus of claim 1, wherein the second optical element is affixed to the frame via a second pair of corresponding hinge points which permit the second optical element to rotate around an axis of the second pair of hinge points.

4. The apparatus of claim 1, wherein the backward angled position is approximately 10-30 degrees from a vertical resting position.

5. The apparatus of claim 1, wherein the first optical element is angled to reflect content displayed by a display of the computing device to the second optical element.

6. The apparatus of claim 1, wherein the apparatus further comprises a removable cover configured to cover the base, the frame, and the first and second optical elements, and wherein the base, the frame, the first optical element, and the second optical element are affixed together as one piece.

7. The apparatus of claim 1, wherein an image receiving plane of the light reflected from the second optical element is parallel to an imaging capturing plane of the embedded web camera of the tabular computing device positioned directly behind the second optical element.

8. The apparatus of claim 1, wherein the computing device comprises a tablet computing device having an embedded web camera incorporated within an upper border of the tablet computing device, and while the base of the apparatus holds a lower border of the tablet computing device, the second optical element has a height that is aligned with a height of the embedded web camera incorporated within the upper border of the tablet computing device.

9. The apparatus of claim 1, wherein the tabular computing device comprises at least one of a tablet computer and a mobile phone.

* * * * *